(12) United States Patent
Saito et al.

(10) Patent No.: US 9,407,471 B2
(45) Date of Patent: Aug. 2, 2016

(54) ADAPTIVE EQUALIZER TAP COEFFICIENT CORRECTION METHOD AND OPTICAL RECEIVER

(71) Applicant: FUJITSU LIMITED, Kawasaki-shi, Kanagawa (JP)

(72) Inventors: Taku Saito, Kawasaki (JP); Nobukazu Koizumi, Kawasaki (JP); Hisao Nakashima, Kawasaki (JP); Osamu Takeuchi, Kawasaki (JP); Hirofumi Araki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 117 days.

(21) Appl. No.: 14/082,521

(22) Filed: Nov. 18, 2013

(65) Prior Publication Data

US 2014/0212132 A1    Jul. 31, 2014

(30) Foreign Application Priority Data

Jan. 31, 2013   (JP) ................................ 2013-017236

(51) Int. Cl.
*H04L 25/03*   (2006.01)
*H04B 10/60*   (2013.01)

(52) U.S. Cl.
CPC ............... *H04L 25/03* (2013.01); *H04B 10/60* (2013.01); *H04L 25/03044* (2013.01)

(58) Field of Classification Search
None
See application file for complete search history.

(56) References Cited

U.S. PATENT DOCUMENTS

2011/0229127 A1   9/2011   Sakamoto et al.
2012/0134684 A1   5/2012   Koizumi et al.
2012/0230676 A1   9/2012   Mo et al.

FOREIGN PATENT DOCUMENTS

JP    2012-119923    6/2012

OTHER PUBLICATIONS

Faruk et al., "Multi-Impairments Monitoring from the Equalizer in a Digital Coherent Optical Receiver", IEEE, 36th European Conference and Exhibition on Optical Communication, Torino, Italy, Sep. 19-23, 2010, pp. 1-3.
Hauske et al., "Optical Performance Monitoring in Digital Coherent Receivers", IEEE, Journal of Lightwave Technology, vol. 27, No. 16, pp. 3623-3631, Aug. 15, 2009.
Extended European Search Report dated Jul. 21, 2014 in corresponding Application No. 13193437.4.

*Primary Examiner* — Darren E Wolf
(74) *Attorney, Agent, or Firm* — Staas & Halsey LLP

(57) ABSTRACT

A method of tap coefficient correction includes: obtaining a synchronization symbol difference between a first polarization and a second polarization orthogonal to the first polarization; obtaining a delay amount of each of the first polarization and the second polarization in an adaptive equalizer; calculating, in a case where a horizontal axis represents a tap number and a vertical axis represents a tap coefficient and a tap number or a nearest tap number with which an area of a drawn figure is halved is set as a gravity center of tap coefficients, a correction reference gravity center of the tap coefficients set in the adaptive equalizer, based on the synchronization symbol difference and the delay amount; and performing a correction of shifting an entire tap coefficients in units of symbol to cause the correction reference gravity center to be closest to a tap center.

16 Claims, 15 Drawing Sheets

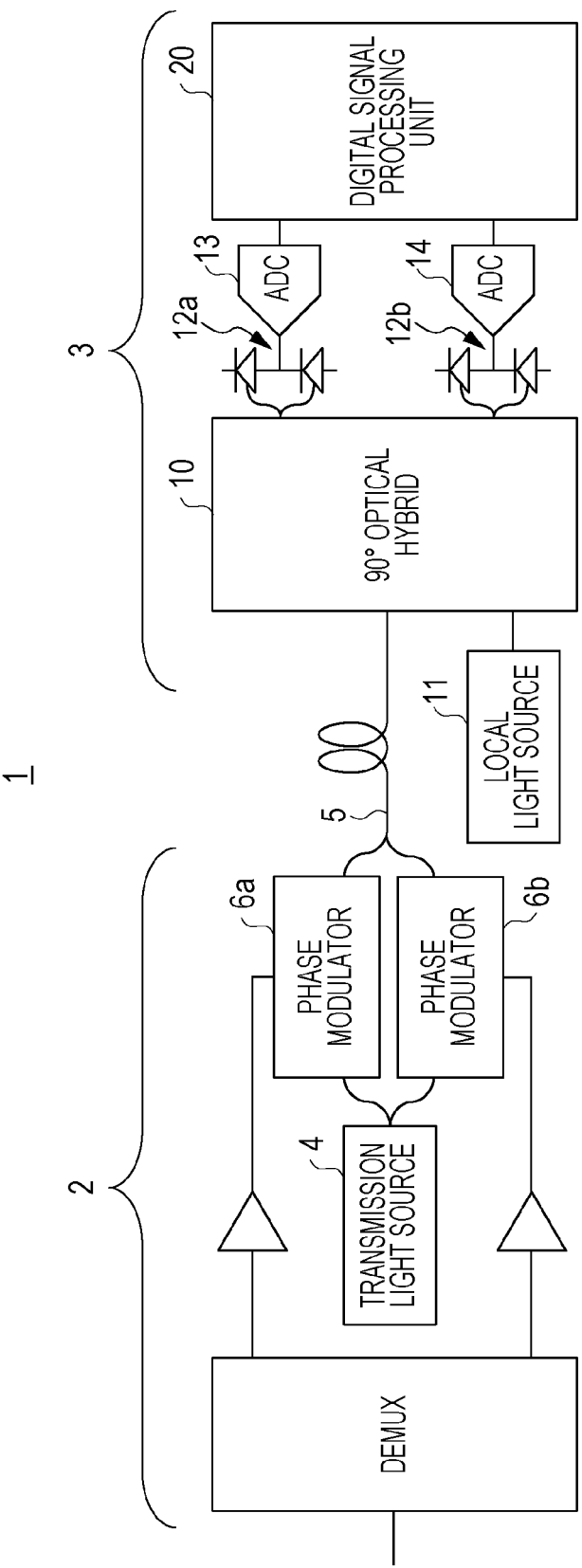

FIG. 8

| | | | | | | | | | | | | |
|---|---|---|---|---|---|---|---|---|---|---|---|---|
| 1 | 2 | 3 | 4 | 5 | 6 | 7 | 8 | 9 | 10 | 11 | 12 | 13 |

HH SEQUENCE REAL PART (R PART)

| | | | | | | | | | | | | |
|---|---|---|---|---|---|---|---|---|---|---|---|---|
| 1 | 2 | 3 | 4 | 5 | 6 | 7 | 8 | 9 | 10 | 11 | 12 | 13 |

HH SEQUENCE IMAGINARY PART (I PART)

| | | | | | | | | | | | | |
|---|---|---|---|---|---|---|---|---|---|---|---|---|
| 1 | 2 | 3 | 4 | 5 | 6 | 7 | 8 | 9 | 10 | 11 | 12 | 13 |

VH SEQUENCE REAL PART (R PART)

| | | | | | | | | | | | | |
|---|---|---|---|---|---|---|---|---|---|---|---|---|
| 1 | 2 | 3 | 4 | 5 | 6 | 7 | 8 | 9 | 10 | 11 | 12 | 13 |

VH SEQUENCE IMAGINARY PART (I PART)

| | | | | | | | | | | | | |
|---|---|---|---|---|---|---|---|---|---|---|---|---|
| 1 | 2 | 3 | 4 | 5 | 6 | 7 | 8 | 9 | 10 | 11 | 12 | 13 |

HV SEQUENCE REAL PART (R PART)

| | | | | | | | | | | | | |
|---|---|---|---|---|---|---|---|---|---|---|---|---|
| 1 | 2 | 3 | 4 | 5 | 6 | 7 | 8 | 9 | 10 | 11 | 12 | 13 |

HV SEQUENCE IMAGINARY PART (I PART)

| | | | | | | | | | | | | |
|---|---|---|---|---|---|---|---|---|---|---|---|---|
| 1 | 2 | 3 | 4 | 5 | 6 | 7 | 8 | 9 | 10 | 11 | 12 | 13 |

VV SEQUENCE REAL PART (R PART)

| | | | | | | | | | | | | |
|---|---|---|---|---|---|---|---|---|---|---|---|---|
| 1 | 2 | 3 | 4 | 5 | 6 | 7 | 8 | 9 | 10 | 11 | 12 | 13 |

VV SEQUENCE IMAGINARY PART (I PART)

FIG. 12

| | 1 | 2 | 3 | 4 | 5 | 6 | 7 | 8 | 9 | 10 | 11 | 12 | 13 |
|---|---|---|---|---|---|---|---|---|---|---|---|---|---|
| HH SEQUENCE REAL PART (R PART) | 1 | 2 | 3 | 4 | 5 | 6 | 7 | 8 | 9 | 10 | 11 | 12 | 13 |
| HH SEQUENCE IMAGINARY PART (I PART) | 1 | 2 | 3 | 4 | 5 | 6 | 7 | 8 | 9 | 10 | 11 | 12 | 13 |
| VH SEQUENCE REAL PART (R PART) | 1 | 2 | 3 | 4 | 5 | 6 | 7 | 8 | 9 | 10 | 11 | 12 | 13 |
| VH SEQUENCE IMAGINARY PART (I PART) | 1 | 2 | 3 | 4 | 5 | 6 | 7 | 8 | 9 | 10 | 11 | 12 | 13 |
| HV SEQUENCE REAL PART (R PART) | 1 | 2 | 3 | 4 | 5 | 6 | 7 | 8 | 9 | 10 | 11 | 12 | 13 |
| HV SEQUENCE IMAGINARY PART (I PART) | 1 | 2 | 3 | 4 | 5 | 6 | 7 | 8 | 9 | 10 | 11 | 12 | 13 |
| VV SEQUENCE REAL PART (R PART) | 1 | 2 | 3 | 4 | 5 | 6 | 7 | 8 | 9 | 10 | 11 | 12 | 13 |
| VV SEQUENCE IMAGINARY PART (I PART) | 1 | 2 | 3 | 4 | 5 | 6 | 7 | 8 | 9 | 10 | 11 | 12 | 13 |

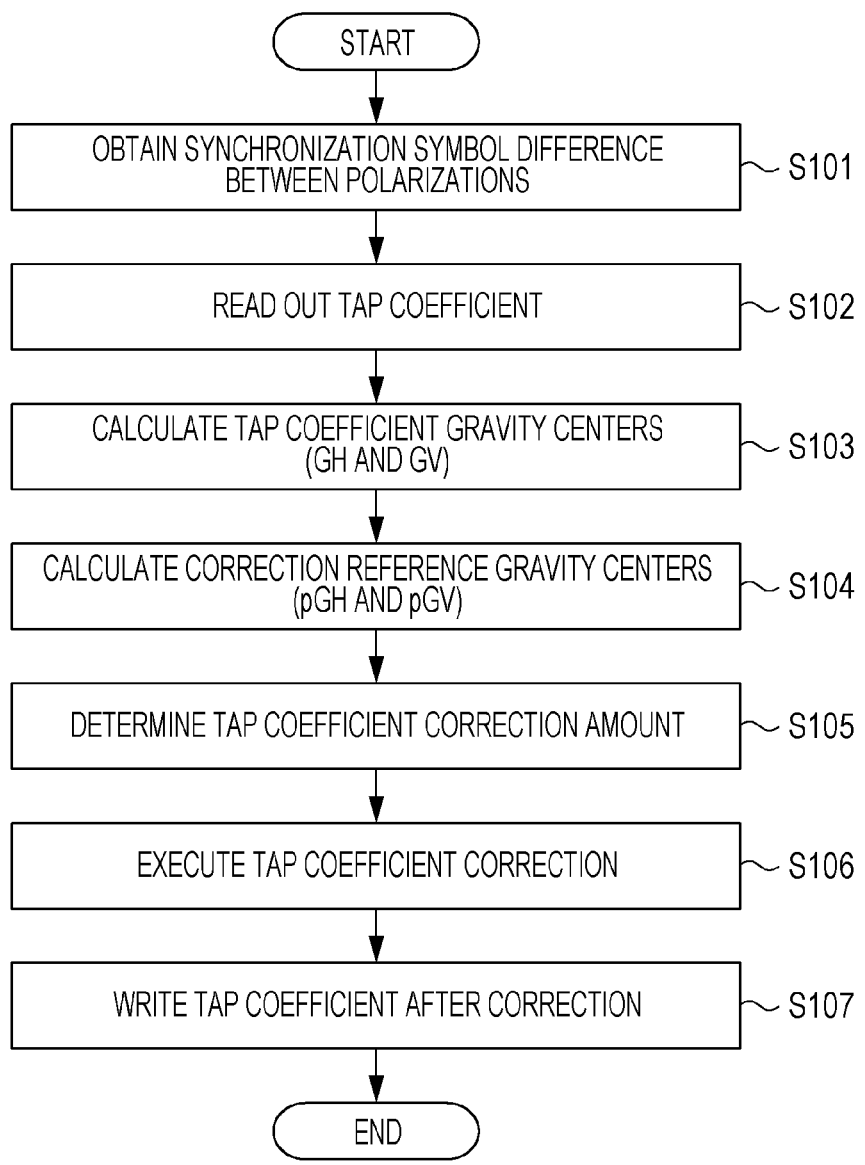

ADAPTIVE EQUALIZER TAP COEFFICIENT CORRECTION METHOD AND OPTICAL RECEIVER

CROSS-REFERENCE TO RELATED APPLICATION

This application is based upon and claims the benefit of priority of the prior Japanese Patent Application No. 2013-017236, filed on Jan. 31, 2013, the entire contents of which are incorporated herein by reference.

FIELD

The embodiment discussed herein is related to an adaptive equalizer tap coefficient correction method and an optical receiver.

BACKGROUND

In recent years, a research on an optical communication based on a digital coherent system has been advanced to cope with an increase in communication traffics. A waveform distortion correction, an adaptive equalization, and the like are carried out by a digital signal processing circuit in a digital coherent receiver, and high characteristics can be obtained even in a transmission at a high bit rate. In a case where a dual polarization-quadrature phase shift keying (DP-QPSK) modulation system is employed, two-bit data may be allocated to four modulated optical phases (0°, 90°, 180°, and 270°) with regard to each of two orthogonal polarizations, and a symbol speed may be reduced to a quarter of the original speed.

The received optical signal is subjected to a photoelectric conversion and an analog/digital conversion, and waveform distortion components and the like are adaptively equalized by an adaptive equalizer in the digital signal processing circuit.

The adaptive equalizer illustrated in FIG. 1 is composed of a butterfly finite impulse response (FIR) filter and adapted to perform a separation of a polarized orthogonal multiple signal, a polarization mode dispersion compensation, and the like. A constant modulus algorithm (CMA) system is used for an adaptive control on tap coefficients of the individual filters, for example. A convergence state is unchanged even when all the tap coefficients on an H side (or all the tap coefficients on a V side) in units of one symbol (in units of the tap number corresponding to one symbol) are shifted by the FIR filter. This is because, when all the tap coefficients are shifted at once, only the absolute time is changed, and the relationship is maintained. In a case where twofold oversampling data is processed, a gravity center location of the tap coefficients in units of two taps (one symbol) is adjusted by shifting the entire tap coefficients so that the signal communication can be resumed without a second pull-in.

In a case where the weight of the tap coefficients is deviated to an end part of the taps, for example, a case where the coefficient value of the tap number 1 or the tap number 13 is high in the 13-tap FIR filter, the equalization residual of the adaptive equalizer is generated, and the signal degradation is caused. For that reason, the weight of the tap coefficients is desirably shifted towards a center of the taps as much as possible.

A specific correction method of shifting the gravity center of the tap coefficients towards the tap center as much as possible is proposed (for example, see Japanese Laid-open Patent Publication No. 2012-119923). The gravity center value of the tap coefficients is calculated, and the tap coefficients are shifted in units of one symbol so that the gravity center of the coefficients is at the center of the taps (in a range between the tap number 6 and the tap number 8 in the case of the 13-tap filter). That is, in a case where a horizontal axis represents the tap number and a vertical axis represents the tap coefficient, a tap number or a nearest tap number with which the area of a drawn figure is halved is referred to as "gravity center of the tap coefficients". The gravity center of the tap coefficients is calculated with respect to each of the H polarization and the V polarization, and the correction of shifting the gravity center of the tap coefficients towards the center of the taps is also conducted with respect to each of the H side and the V side.

According to the related art method, to carry out the correction of shifting the gravity center of the tap coefficients towards the tap center, an instantaneous value representing the tap coefficient gravity center at that moment is used. According to this method, an optimal correction is not carried out depending on a state of the polarizations, and a correction effect is not attained to a maximum extent. As a result, a differential group delay (DGD) resistance is decreased, and a bit error is likely to increase.

SUMMARY

According to an aspect of the invention, a method of tap coefficient correction includes: obtaining a synchronization symbol difference between a first polarization and a second polarization orthogonal to the first polarization; obtaining a delay amount of each of the first polarization and the second polarization in an adaptive equalizer; calculating, in a case where a horizontal axis represents a tap number and a vertical axis represents a tap coefficient and a tap number or a nearest tap number with which an area of a drawn figure is halved is set as a gravity center of tap coefficients, a correction reference gravity center of the tap coefficients set in the adaptive equalizer, based on the synchronization symbol difference and the delay amount; and performing a correction of shifting an entire tap coefficients in units of symbol to cause the correction reference gravity center to be closest to a tap center.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a schematic diagram of an optical communication system to which the method according to the embodiment is applied;

FIG. 8 illustrates a state in which tap coefficients are read out;

FIG. 12 illustrates a state in which tap coefficients after the correction are written in;

FIG. 13 is a flow chart for the tap coefficient correction method according to the embodiment;

DESCRIPTION OF EMBODIMENT

Figure 2:
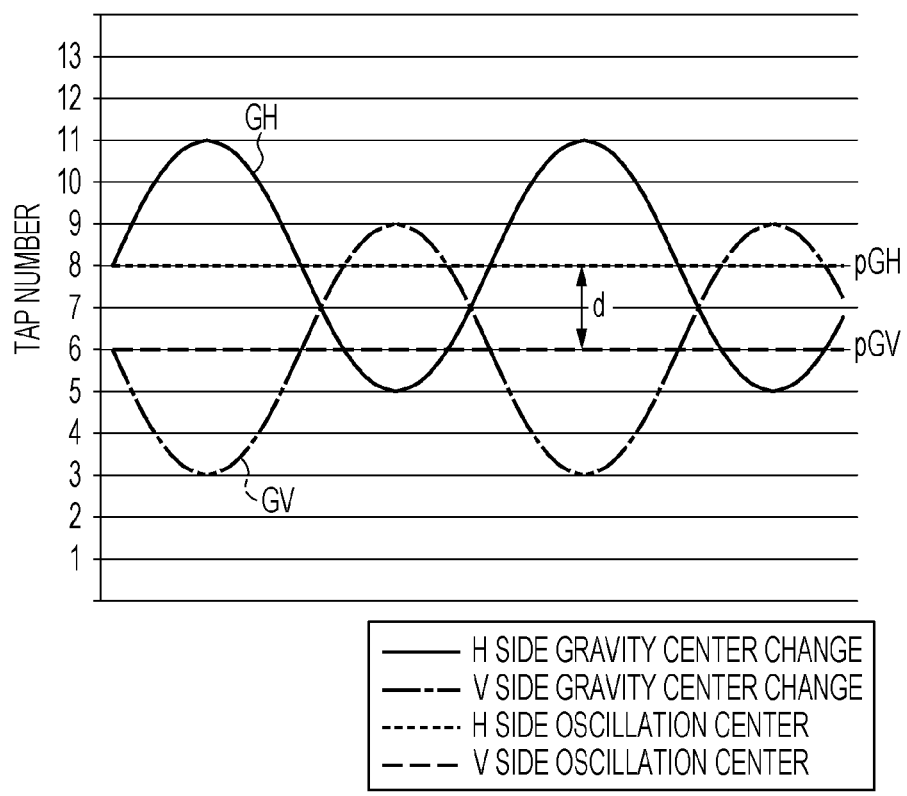
FIG. 2 is a graphic presentation of fluctuations of tap coefficient gravity center locations of an H polarization and a V polarization.

The problem of the tap coefficient correction method in related art which has been found by the applicants of the present application will be described with reference to FIG. 2. The gravity centers of the tap coefficients set in the adaptive equalizer are changed so that the gravity center locations of the tap coefficients on an H side and a V side are symmetric to each other by polarization rotations. If it is assumed that the polarization rotations are uniform, the fluctuations of the gravity center locations of the tap coefficients appear as periodic fluctuations like sign waves. The actual polarization rotations are not uniform and are changed in a complex manner.

A maximum amplitude of the fluctuation of the tap coefficient gravity center GH on the H side and a maximum amplitude of the fluctuation of the tap coefficient gravity center GV on the V side are determined on the basis of the differential group delay (DGD) amount. When a fluctuation center of the tap coefficient gravity center GH of the H polarization is set as pGH, and a fluctuation center of the tap coefficient gravity center GV of the V polarization is set as pGV, a difference between pGH and pGV is equivalent to a synchronization symbol difference. When a digital sampling rate is set as two samples per symbol, in the case of FIG. 2, a synchronization symbol difference of two taps, that is, one symbol is caused.

If a correction of simply shifting the tap coefficient gravity center at any given time towards the tap central part (for example, in a range between the tap number 6 and the tap number 8 in a 13-tap filter) is executed, the situation may unexpectedly be deteriorated in some cases. This problem will be described with reference to FIG. 3A and FIG. 3B.

Figure 3A:
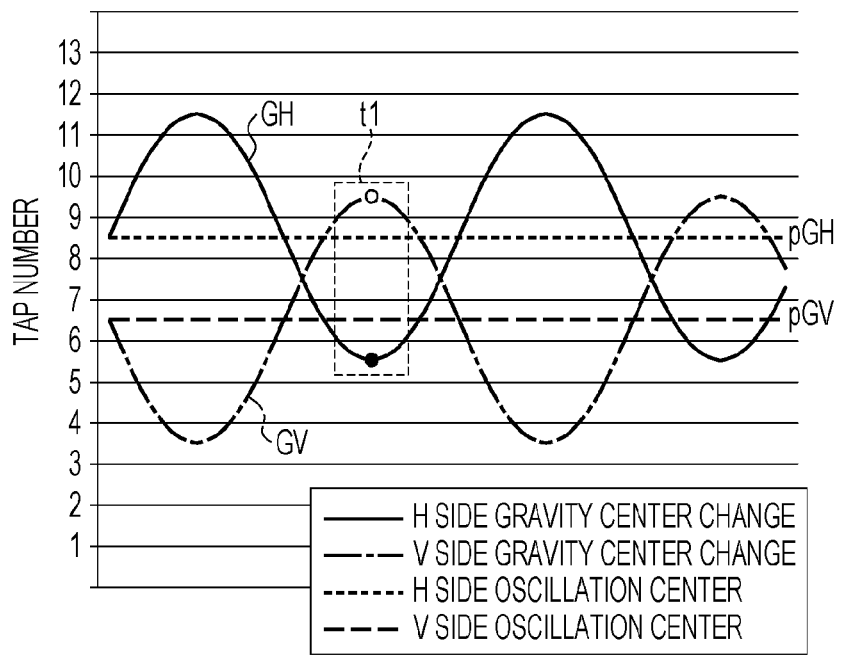
FIG. 3A and FIG. 3B are explanatory diagrams for describing a problem in a tap coefficient correction method in related art.

In FIG. 3A, at a time t1, the tap coefficient gravity center (black circle) of the H polarization is located between the tap number 5 and the tap number 6, and the tap coefficient gravity center (white circle) of the V polarization is located between the tap number 9 and the tap number 10. Although the fluctuation center pGV of the tap coefficient gravity center GV of the V polarization is at the tap central part, the fluctuation change pGH of the tap coefficient gravity center GH of the H polarization is deviated in a direction towards a higher tap number. Under normal circumstances, a correction of pulling in the tap coefficient gravity center of the H polarization towards the central part (in a direction towards a lower tap number) is to be conducted.

Figure 3B:
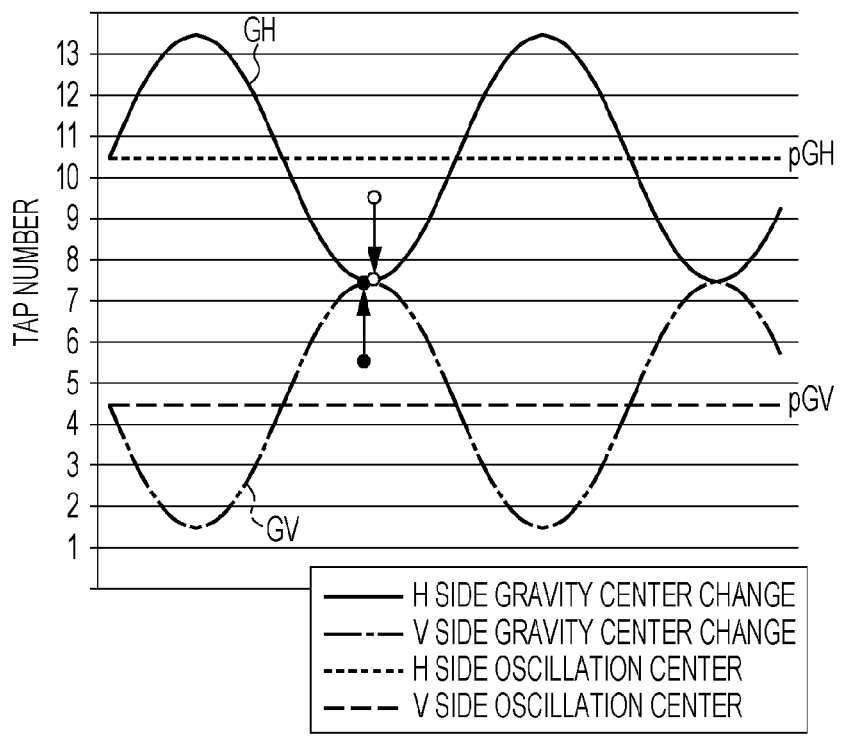

However, if attention is paid only on the tap coefficient gravity center value at the time t1 and the correction of shifting the coefficient gravity center towards the tap center is conducted, as illustrated in FIG. 3B, a correction of raising the coefficient gravity center (black circle) at a bottom of the fluctuation towards the tap center is executed. As a result, the tap coefficient gravity center GH of the H polarization fluctuates in a region farther away from the tap center.

On the other hand, the tap coefficient gravity center GV of the V polarization at t1 is out of the tap central part, but since the fluctuation center pGV is the vicinity of the tap center, it is conceivable that the correction may not be carried out. However, according to the correction method in related art, a correction of dragging down the coefficient gravity center (white circle) at a peak of the fluctuation towards the tap center is executed. As a result, the tap coefficient gravity center GV of the V polarization that has fluctuated in the tap central part is unexpectedly reshifted from the tap center.

The gravity center of the tap coefficients indicates an entire signal location and represents a delay amount of the signal. According to the method in related art, the gravity centers of the tap coefficients of the H polarization and the V polarization may be deviated to the both ends of the taps in some cases, the adaptive equalization may not be properly executed. According to the embodiment, this problem is to be solved, and the effect of the adaptive equalization is maximized.

Figure 4A:
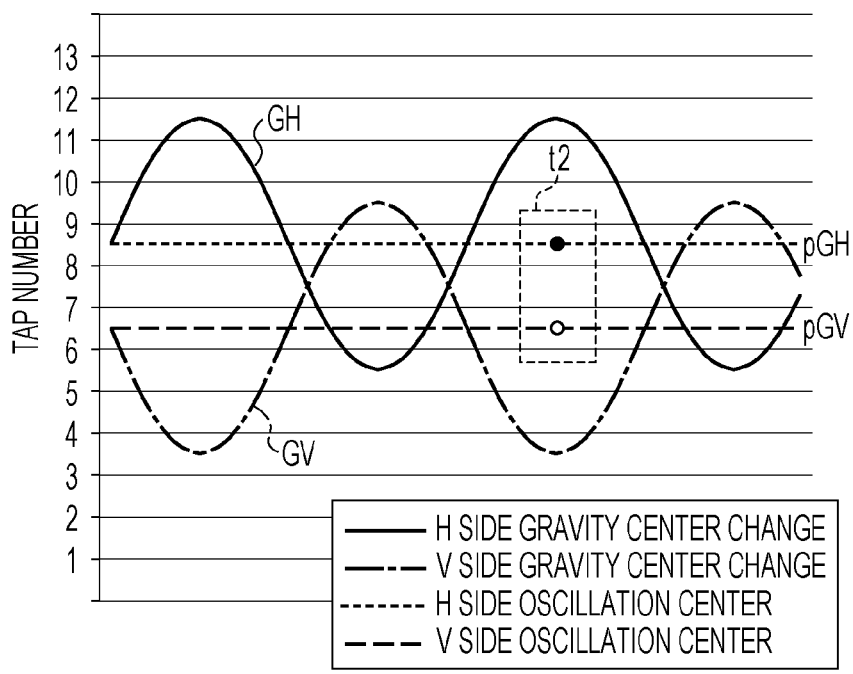
FIG. 4A and FIG. 4B are explanatory diagrams for describing a principle of a tap coefficient correction method according to an embodiment.
Figure 4B:
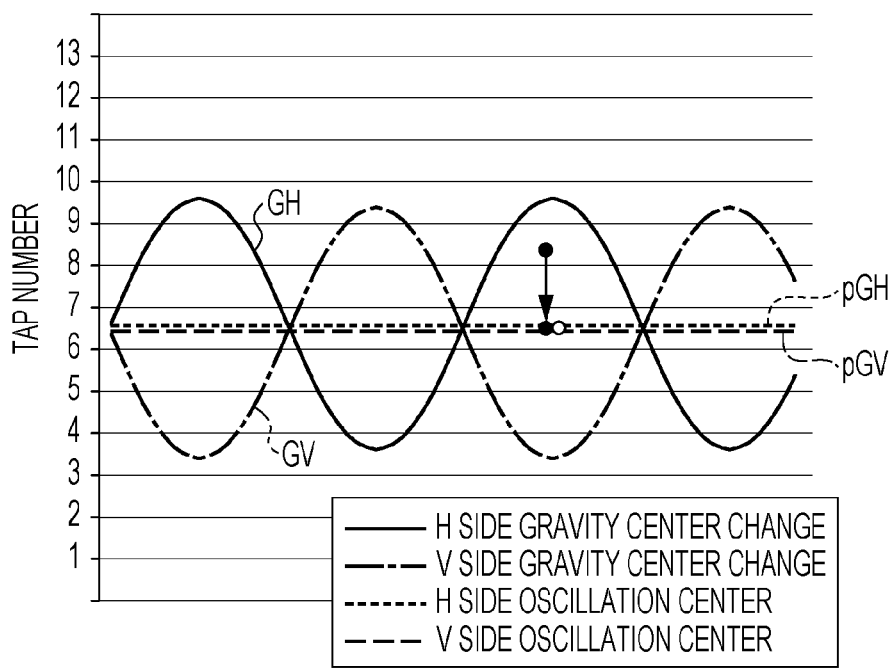

FIG. 4A and FIG. 4B are explanatory diagrams for describing a principle of a principle of the tap coefficient correction method according to the embodiment. According to the embodiment, an instantaneous coefficient gravity center value is not set as it is as a reference for the gravity center correction, but a fluctuation center of the gravity center of the tap coefficients is used as the reference for the gravity center correction. While a correction of shifting the fluctuation center of the gravity center towards the tap center is conducted, the gravity center correction of the tap coefficients is more accurately carried out.

In FIG. 4A, the tap coefficient gravity center GV of the V polarization at a time t2 is at a bottom of the fluctuation. According to the related art method, the correction of shifting the tap coefficient gravity center GV by the 4 taps (2 symbols) towards the higher tap number direction is executed at this time. According to the embodiment, attention is paid on the fluctuation center pGV of the tap coefficient gravity center GV. Since the fluctuation center pGV at the time t2 exists in the tap central part (in the range between the tap number 6 and the tap number 8), the correction is not to be carried out.

On the other hand, the tap coefficient gravity center pGH of the H polarization at the time t2 is at a peak of the fluctuation. According to the related art method, the correction of shifting the coefficient gravity center by the 4 taps (2 symbols) towards the lower tap number direction is executed at this time. However, when attention is paid on the fluctuation change pGH of the tap coefficient gravity center GH, the fluctuation change pGH at the time t2 is slightly deviated from the tap central part. In view of the above, the fluctuation change pGH is shifted by the two taps (one symbol) towards the lower tap number direction.

As illustrated in FIG. 4B, the gravity center movement is not conducted with respect to the V polarization, and the fluctuation change pGH of the tap coefficient gravity center in the H polarization is shifted by one symbol towards the tap center. As a result, the fluctuation centers of the tap coefficient gravity centers of the H polarization and the V polarization are almost matched with each other. A synchronization symbol difference between the polarizations is cancelled (to be zero), and it is possible to bring out the correction effect to the maximum extent. As a result, the DGD resistance is improved, the increase in bit errors is suppressed.

According to the embodiment below, since the fluctuation centers pGH and pGV of the tap coefficient gravity centers are used as the correction reference gravity centers, the fluctuation centers are appropriately referred to as "correction reference gravity center pGH" and "correction reference gravity center pGV".

FIG. 5 is a schematic diagram of an optical communication system to which the tap coefficient correction method according to the embodiment is applied. An optical communication system 1 includes an optical transmitter 2 and an optical receiver 3 which are connected to each other via an optical transmission path 5.

Light emitted from a transmission light source 4 of the optical transmitter 2 is guided to phase modulators 6a and 6b, subjected to a phase modulation in accordance with output data signals of a demultiplexer (Demux), and output to the optical transmission path 5. The optical signal received by the optical receiver 3 is mixed with local oscillation light from a local light source 11 at a 90° optical hybrid (optical mixer) 10, and an in phase (I) interference component and a quadrature (Q) interference component are output to light sensors 12 such as balanced photo diodes 12a and 12b. The balanced photo diodes 12a and 12b output differential currents of positive phase and reversed phase lights. The current signals are converted into voltage signals by transimpedance amplifiers (TIAs) which are not illustrated in the drawing and supplied to ADCs 13 and 14. The ADCs 13 and 14 perform digital sampling at a twofold oversampling rate, for example. The digitalized reception signals are input to a digital signal processing unit 20. For convenience of the illustration, the polarization separation is omitted on both the transmission side and the reception side in FIG. 5, and only processing with respect to one polarization is illustrated, but similar processing is carried out with respect to the other polarization.

Figure 6:
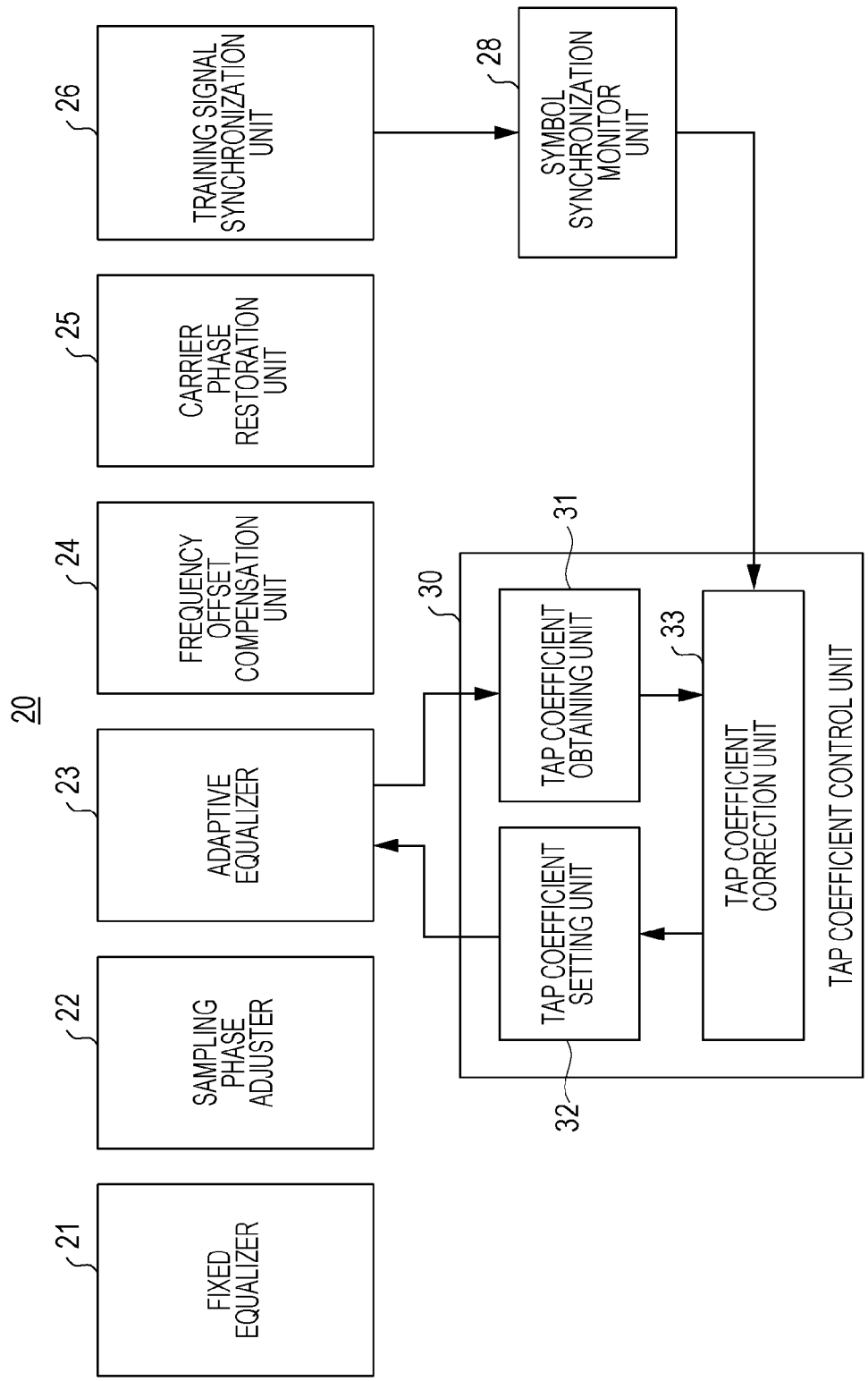
FIG. 6 is a schematic diagram of a digital signal processing unit according to the embodiment.

FIG. 6 is a configuration diagram of the digital signal processing unit 20 illustrated in FIG. 5. The digital signal processing unit 20 includes a fixed equalizer 21, a sampling phase adjuster 22, an adaptive equalizer 23, a frequency offset compensation unit 24, a carrier phase restoration unit 25, a training signal synchronization unit 26, a symbol synchronization monitor unit 28, and a tap coefficient control unit 30.

The tap coefficient control unit 30 includes a tap coefficient obtaining unit 31, a tap coefficient setting unit 32, and a tap coefficient correction unit 33.

Figure 1:
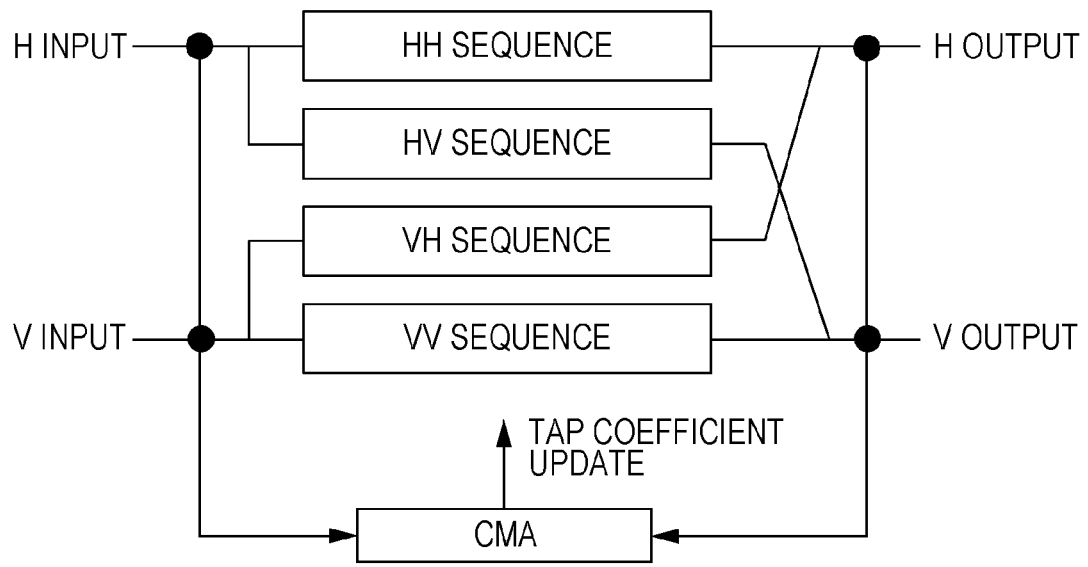
FIG. 1 is a schematic configuration diagram of an adaptive equalizer composed of a butterfly FIR filter.

The waveform distortion of the digital input signal is suppressed by the fixed equalizer 21. The digital input signal is subjected to a phase adjustment by the sampling phase adjuster 22 and input to the adaptive equalizer 23. As illustrated in FIG. 1, the H polarization input to the adaptive equalizer 23 includes the H polarization component (HH sequence) and the V polarization component (HV sequence) at the time of the transmission. The V polarization input to the adaptive equalizer 23 includes the V polarization component (W sequence) and the H polarization component (VH sequence) at the time of the transmission. Since the optical signal is received in a state in which the components of the H axis and the V axis are mixed with each other, the H component and the V component at the time of the transmission are restored by using the four sequences of HH, HV, VH, and W in the adaptive equalizer (polarization separation).

The adaptive equalizer 23 includes a finite impulse response (FIR) filter corresponding to the HH, HV, VH, and W sequences. The tap coefficients of the individual FIR filters are controlled by the tap coefficient control unit 30. The specific tap coefficient control will be described below.

The frequency offset compensation unit 24 compensates an optical frequency deviation (offset) between the transmission light source 4 and the local light source 11. The carrier phase restoration unit 25 corrects a phase difference between the transmission light source 4 and the local light source 11. The training signal synchronization unit 26 detects training sequences for synchronization of the individual sequences of HH, HV, VH, and W and establishes the synchronization between the sequences.

The symbol synchronization monitor unit 28 obtains the symbol synchronization times of the H polarization and the V polarization to detect the synchronization symbol difference between the polarizations and supplies the detection result to the tap coefficient correction unit 33 of the tap coefficient control unit 30.

The synchronization symbol difference is detected from the training sequences according to the embodiment, but the present disclosure is not limited to this example. For example, in a case where a multi-lane distribution (MLD) is adopted, an inter-lane synchronization unit may be provided, and the symbol synchronization monitor unit 28 may be configured to obtain the synchronization time from the inter-lane synchronization unit.

Figure 7:
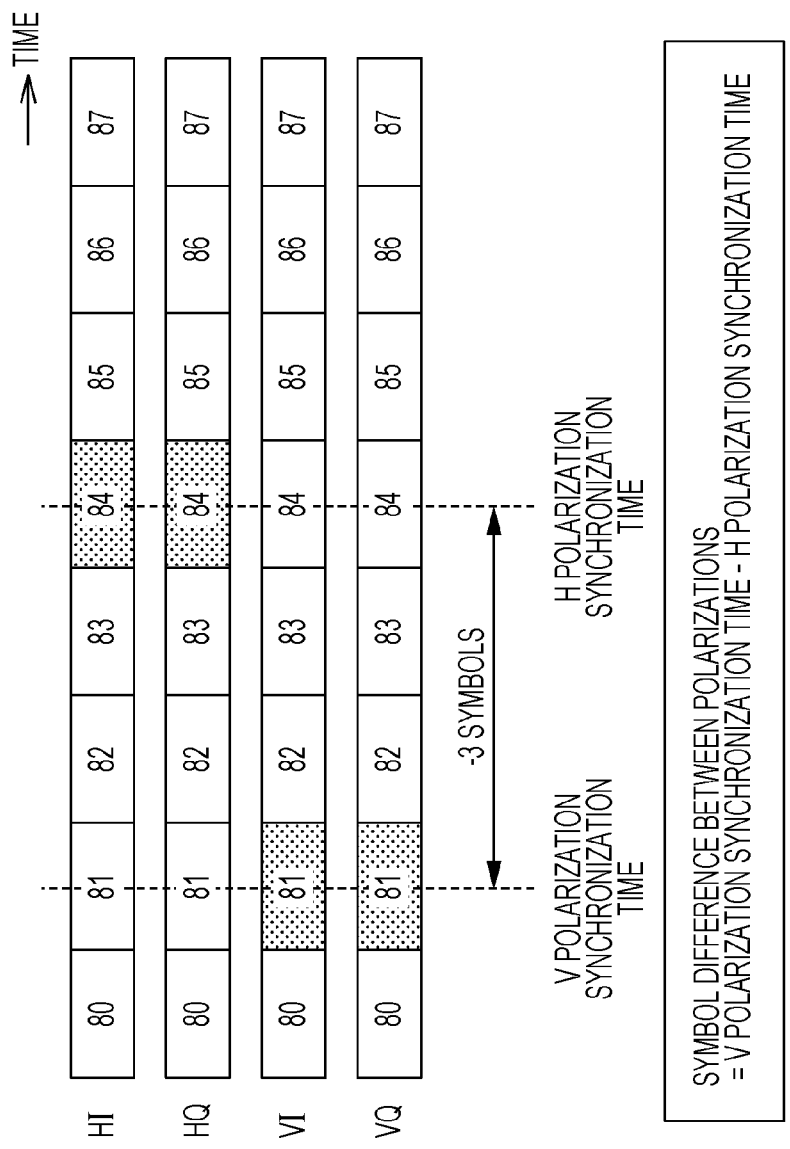
FIG. 7 illustrates a state in which a symbol synchronization time is obtained.

FIG. 7 is an explanatory diagram for describing a state in which the symbol synchronization time is obtained by the symbol synchronization monitor unit 28. The synchronization symbol difference between the polarizations is represented by a difference between the synchronization time of the V polarization and the synchronization time of the H polarization.

In a case where the H polarization is synchronized first, and the V polarization is synchronized thereafter, the synchronization symbol difference is assigned with a plus sign herein. In a case where the V polarization is synchronized first, and the H polarization is synchronized thereafter, the synchronization symbol difference is assigned with a minus sign. Since the symbol difference is relative, a definition of the coefficient shift of the tap coefficient correction unit may be reversed by reversing plus and minus.

In the case of FIG. 7, the V polarization is synchronized in the 81st symbol section, and the H polarization is synchronized next in the 84th symbol section. The synchronization symbol difference between the polarizations is −3 symbols. This synchronization symbol difference is supplied to the tap coefficient correction unit 33.

FIG. 8 illustrates a state in which the tap coefficients are read out. The tap coefficient obtaining unit 31 reads out tap coefficients of the individual filters constituting the adaptive equalizer 23. Coefficients in a real number part (R part) and an imaginary part (I part) are set in the individual sequences of HH, VH, HV, and W. In the case of the 13-tap filter, 104 tap coefficients are read out as follows.

$$4\ sequences \times 2 \times 13\ taps = 104$$

The adaptive equalizer 23 executes a coefficient update algorithm in related art to update the coefficient value. A constant modulus algorithm (CMA) or a decision-directed least mean square (DD-LMS) algorithm can be used as the coefficient update algorithm. The tap coefficient read out by the tap coefficient obtaining unit 31 is determined by the coefficient update algorithm in related art as described above.

The correction is executed with respect to this coefficient by the tap coefficient correction unit 33 and written back by the tap coefficient setting unit 32.

The tap coefficient correction unit 33 calculates the tap coefficient gravity center GH of the H polarization and the tap coefficient gravity center GV of the V polarization by using the read coefficient values. The tap coefficient gravity centers GH and GV are obtained from Expression (1).

$$G_H = \left(\sum_{i=1}^{13} i*|HH(i)|^2 + \sum_{i=1}^{13} i*|VH(i)|^2\right) \Big/ (P_{HH} + P_{VH}) \quad (1)$$

$$G_V = \left(\sum_{i=1}^{13} i*|VV(i)|^2 + \sum_{i=1}^{13} i*|HV(i)|^2\right) \Big/ (P_{VV} + P_{HV})$$

Where $P_{HH}$, $P_{VH}$, $P_{VV}$, and $P_{HV}$ are total sum of power in all the tap numbers of the corresponding FIR filter and are represented by Expression (2).

$$P_{HH} = \sum_{i=1}^{13}|HH(i)|^2, \; P_{VH} = \sum_{i=1}^{13}|VH(i)|^2, \quad (2)$$

$$P_{HV} = \sum_{i=1}^{13}|HV(i)|^2, \; P_{VV} = \sum_{i=1}^{13}|VV(i)|^2$$

A calculation for a square of power of the individual tap numbers of the individual sequences ($|*|^2$) is conducted by using the real (R) part and the imaginary (I) part as represented in Expression (3).

$$|HH(i)|^2 = HH_R(i) \cdot HH_R(i) + HH_I(i) \cdot HH_I(i)$$

$$|HV(i)|^2 = HV_R(i) \cdot HV_R(i) + HV_I(i) \cdot HV_I(i)$$

$$|VH(i)|^2 = VH_R(i) \cdot VH_R(i) + VH_I(i) \cdot VH_I(i)$$

$$|VV(i)|^2 = VV_R(i) \cdot VV_R(i) + VV_I(i) \cdot VV_I(i) \quad (3)$$

Next, the tap coefficient correction unit 33 uses the synchronization symbol difference obtained from the symbol synchronization monitor unit 28 and the tap coefficient gravity centers GH and GV of the H polarization and the V polarization calculated as described above to calculate the correction reference gravity center (fluctuation center) pGH of the H polarization and the correction reference gravity center (fluctuation center) pGV of the V polarization.

When the synchronization symbol difference between the polarizations is set as SYMBOL_DIFF, and the tap coefficient gravity centers of the respective polarizations are set as (GH and GV), a deviation amount G_DELTA from the correction reference gravity centers of the tap coefficient gravity centers is represented as follows.

$$G\_DELTA = (SYMBOL\_DIFF) \times 2 + GH - GV \quad (4)$$

Figure 9:
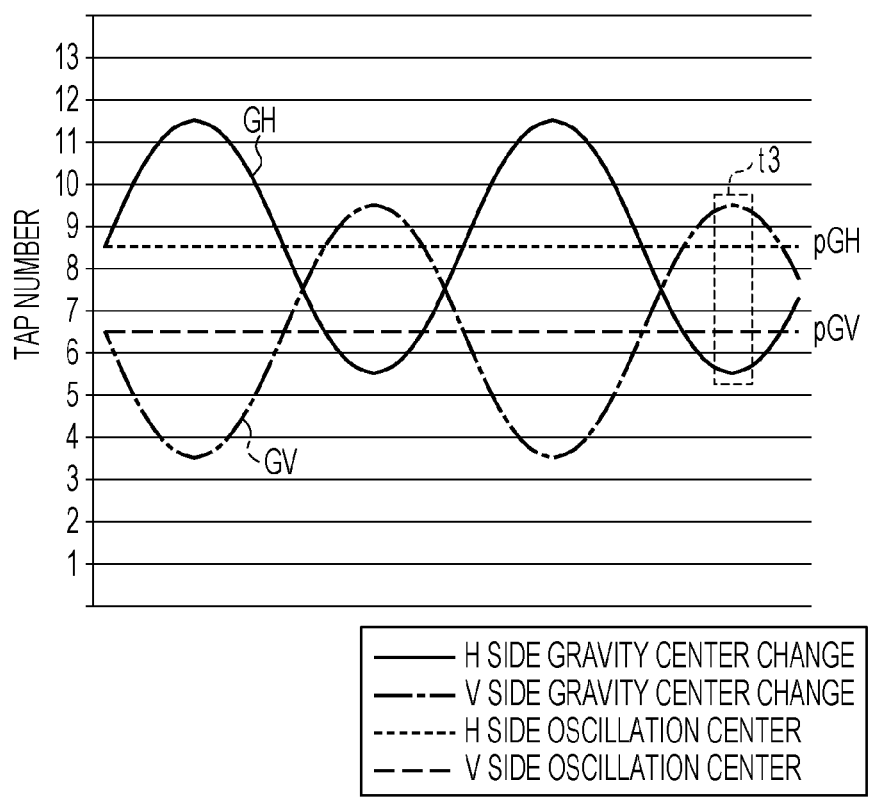
FIG. 9 is an explanatory diagram for describing a method of obtaining the fluctuation centers of the coefficient gravity centers of the respective polarizations.

The calculation in Expression (4) will be described with reference to FIG. 9. Values to be obtained at a time t3 with regard to the tap coefficient gravity center GH of the H polarization and the tap coefficient gravity center GV of the V polarization are the fluctuation centers pGH and pGV of the tap coefficient gravity centers corresponding to the correction reference gravity centers. The deviation amount G_DELTA from the correction reference gravity centers of the tap coefficient gravity centers of the respective polarizations at t3 is represented as follows.

$$G\_DELTA = (GV - pGV) + (pGH - GH) \quad (4')$$

$$= pGH - pGV + GV - GH$$

$$= (SYMBOL\_DIFF) \times 2 + GH - GV$$

Herein, a case in which the twofold oversampling, that is, sampling data of two taps per symbol is processed is taken as an example.

The correction reference gravity centers pGH and pGV are obtained from Expression (5).

$$pGH = GH + G\_DELTA/2$$

$$pGV = GV + G\_DELTA/2 \quad (5)$$

When Expression (4) is assigned to Expression (5), Expression (6) is obtained.

$$pGH = (GH+GV)/2 + SYMBOL\_DIFF$$

$$pGV = (GH+GV)/2 - SYMBOL\_DIFF \quad (6)$$

In Expression (6), the correction reference gravity centers pGH and pGV of the H polarization and the V polarization can be calculated on the basis of the tap coefficient gravity center GH of the H polarization, the tap coefficient gravity center GV of the V polarization, and the synchronization symbol difference SYMBOL_DIFF between the polarizations.

The tap coefficient correction unit 33 determines the gravity center correction amount of the tap coefficients (shift amount) on the basis of the correction reference gravity centers pGH and pGV.

Figure 10:
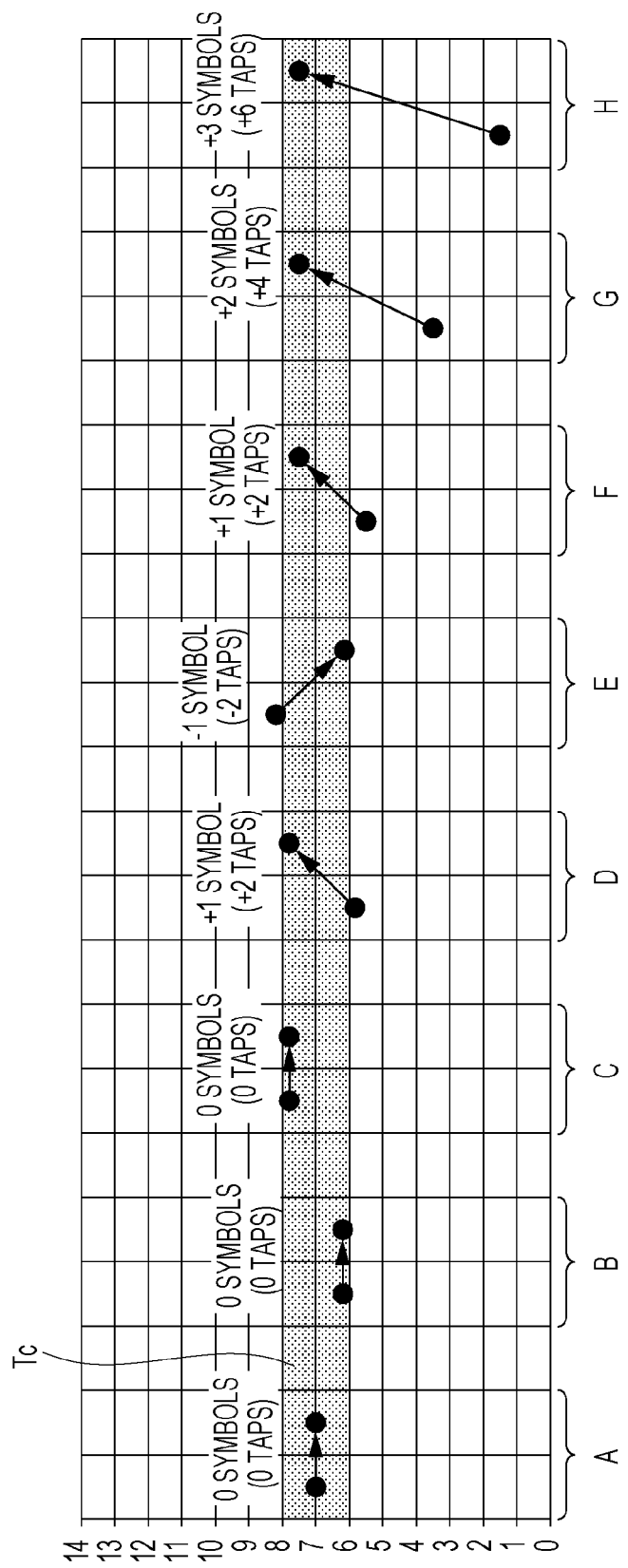
FIG. 10 illustrates a state in which the tap coefficient correction amount is determined.

FIG. 10 illustrates a state in which the tap coefficient correction (shift) amount is determined. The tap coefficient correction unit 33 determines the correction amount so that the calculated correction reference gravity centers pGH and pGV are located in a tap center region Tc. In the example of FIG. 10, the correction amount is determined so as to satisfy 6≤pGH≤8 and 6≤pGV≤8. Since the gravity center correction is conducted in units of the symbol, the tap number to be shifted is an even number in the case of the twofold oversampling.

As represented in A, B, and C of FIG. 10, in a case where the correction reference gravity centers (the fluctuation centers of the tap coefficient gravity centers) are located in the tap center region Tc and 6≤pGH≤8 and 6≤pGV≤8 are satisfied, the gravity center correction amount is set as 0 symbols (0 taps).

As represented in D, E, and F of FIG. 10, in a case where the correction reference gravity centers is deviated in a range of 1 symbol or below from the tap center region Tc, the gravity center correction amount is set as +1 symbol (+2 taps) or −1 symbol (−2 taps). As represented in G of FIG. 10, in a case where the correction reference gravity centers is deviated from the tap center region Tc in a range of more than 1 symbol and 2 symbols or below, the gravity center correction amount is set as 2 symbols in the plus direction or the minus direction. In the case of H of FIG. 10, the gravity center correction amount is set as +3 symbols.

Figure 11:
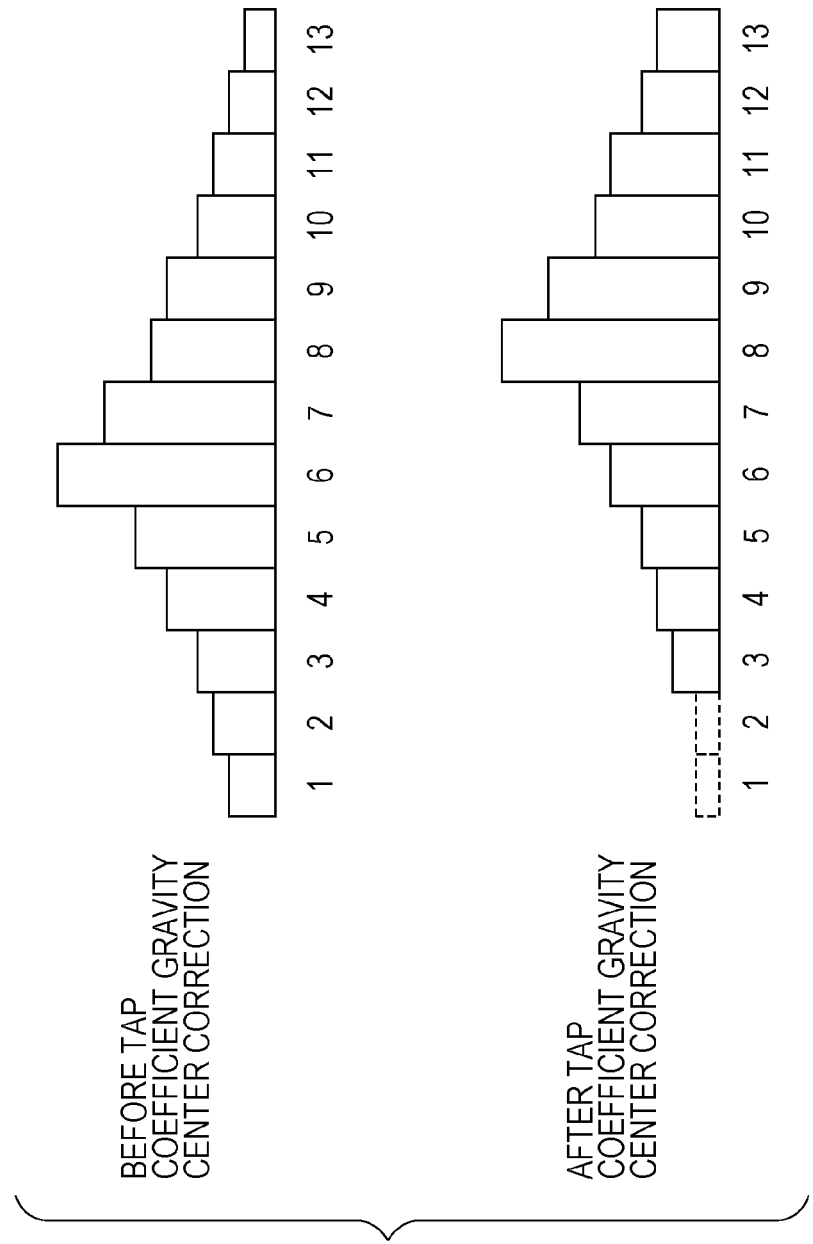
FIG. 11 illustrates a state in which the tap coefficient correction is executed.

FIG. 11 illustrates the tap coefficient gravity center before the correction and after the correction. The updated tap coefficients read out from the adaptive equalizer 23 are shifted by the calculated gravity center correction amount. According to the embodiment, the tap coefficients of the FIR filters that process the HH sequence and the VH sequence connected to the H polarization output are corrected by the same amount.

Similarly, the tap coefficients of the FIR filters that process the W sequence and the HV sequence connected to the V polarization output (see FIG. 1).

For example, it is supposed that the correction of shifting the correction reference gravity center pGH of the H polarization by +2 taps (+1 symbol) and the correction reference gravity center pGV of the V polarization by −2 taps (−1 symbol) is determined. In this case, the tap coefficients of the HH filter and the tap coefficients of the VH filter are shifted by +2 taps, and the tap coefficients of the W filter and the tap coefficients of the HV filter are shifted by −2 taps.

In FIG. 11, in a case where the gravity center correction of shifting the tap coefficients of the HH filter by +1 symbol (+2 taps) is conducted, the entire coefficients of the tap numbers 1 to 13 are shifted by 2 taps towards the right side, and "0" is padded to the tap numbers 1 and 2 on the leftmost side.

When the new tap coefficients are determined, the tap coefficient setting unit 32 writes the tap coefficients after the correction in the adaptive equalizer 23.

FIG. 12 illustrates a state in which the tap coefficients after the correction are written. The coefficients in the real number part (R part) and the imaginary part (I part) are written in with regard to each of the four sequences of HH, VH, HV, and W. In a case where the individual filter is the 13-tap filter, 104 tap coefficients are written in as follows.

4 sequences×2×13 taps=104.

FIG. 13 illustrates a process flow executed by the tap coefficient control unit 30. The tap coefficient control unit 30 obtains the synchronization symbol difference between the H polarization and the V polarization from the symbol synchronization monitor unit 28 (S101). The tap coefficient control unit 30 reads out the tap coefficients set in the individual filters from the adaptive equalizer 23 in concurrence with S101 or before or after S101 (S102).

The tap coefficient gravity centers (GH and GV) are calculated with respect to the read tap coefficients (S103). The tap coefficient gravity centers (GH and GV) represent the delay amounts of the adaptive equalizer.

The correction reference gravity centers pGH and pGV (fluctuation centers of the tap coefficient gravity centers according to the embodiment) are calculated on the basis of the obtained tap coefficient gravity centers (GH and GV) and the synchronization symbol difference between the polarizations obtained in S101 by using Expression (6) (S104).

The correction amount of the tap coefficients is determined in units of symbol on the basis of the correction reference gravity centers pGH and pGV (S105). The tap coefficient correction amount is the shift amount for shifting the correction reference gravity centers pGH and pGV towards a region in the vicinity of the tap center. As described above, the shift amount of the tap coefficients is determined in units of symbol (in units of two taps in the case of the twofold oversampling, and in units of four taps in the case of the fourfold oversampling).

The correction of shifting the entire tap coefficients of the filters (the HH filter and the VH filter of FIG. 1) for the H polarization output is conducted on the basis of the determined tap coefficient correction amount, and the correction of shifting the entire tap coefficients of the filters (the HV filter and the W filter of FIG. 1) for the V polarization output is conducted (S106).

Finally, the tap coefficients on which the gravity center correction has been conducted are written in the adaptive equalizer 23 (S107), and the processing is ended.

Figure 14A:
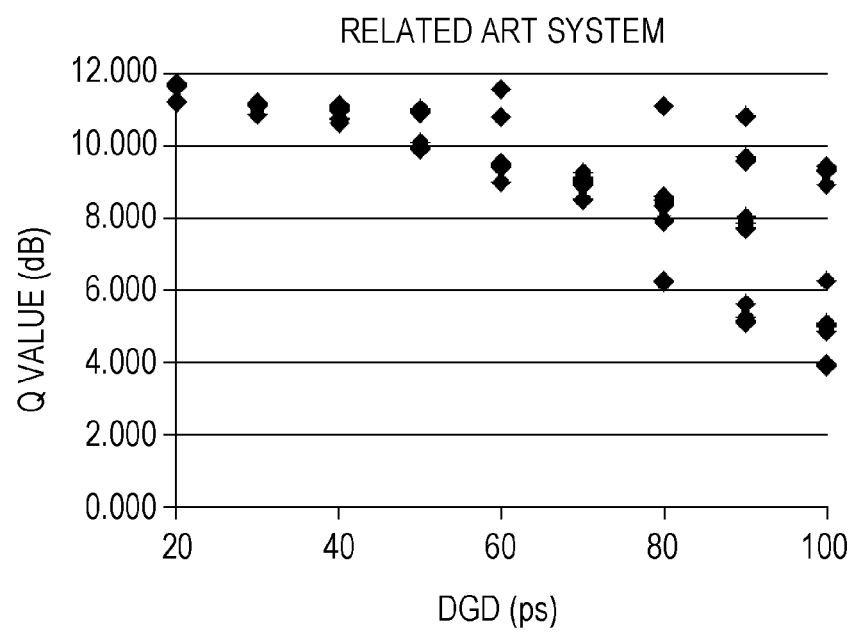
FIG. 14A and FIG. 14B are explanatory diagrams for describing an effect of the correction method according to the embodiment.
Figure 14B:
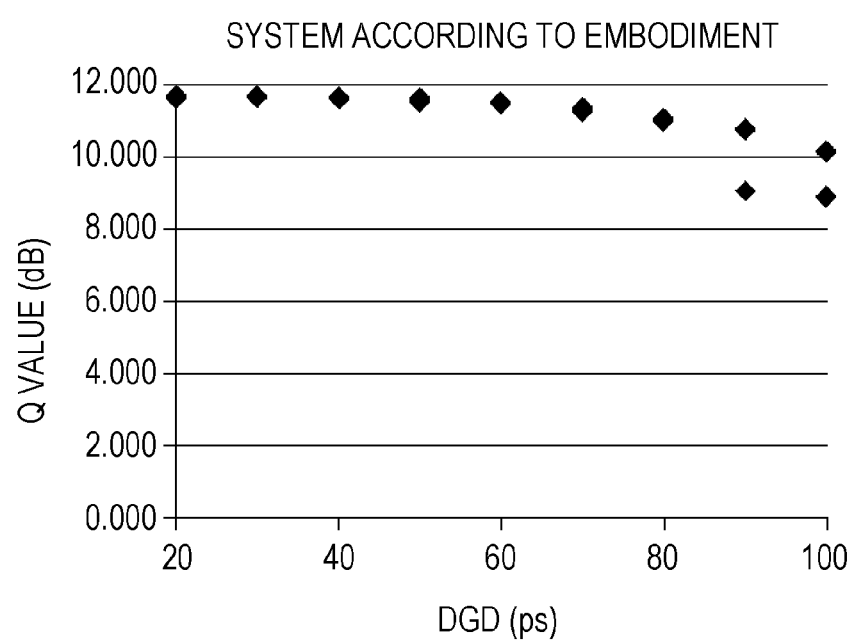

FIG. 14A and FIG. 14B illustrate an effect of the tap correction method according to the above-mentioned embodiment. In FIG. 14A and FIG. 14B, a horizontal axis of the graphic representation represents the differential group delay (ps), and a vertical axis represents a Q value (dB). With regard to both the method in related art and the method according to the embodiment, a simulation result based on a bit error rate (the number of reception error bits/the number of transmitted bits) is converted into the Q value.

According to the related art system, as the DGD is increased, the Q value is decreased, and the dispersion is increased. On contrast to this, with the method according to the embodiment, even when the DGD is increased, the Q value is almost unchanged, and the dispersion is minute. This is because the fluctuation center of the tap coefficient gravity center is used as the reference for the gravity center correction. The correction of shifting the gravity centers of the tap coefficients towards the tap center is more accurately executed by using the correction reference gravity centers pGH and pGV obtained from the synchronization symbol difference between the polarizations and the delay amounts of the adaptive equalizer (the tap coefficient gravity centers according to the embodiment). As a result, the synchronization symbol difference becomes zero, and the performance of the adaptive equalizer can be maximized.

Modified Example

Figure 15A:
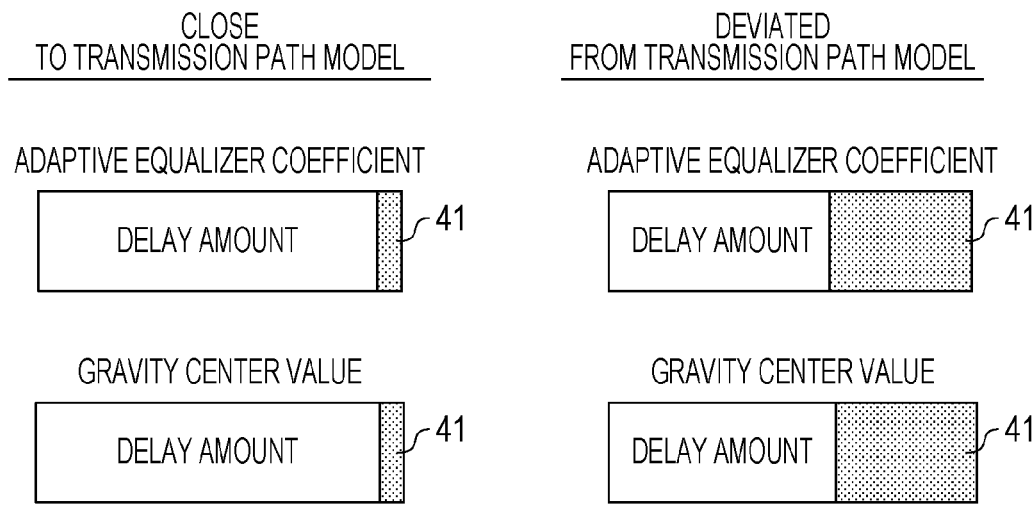
FIG. 15A and FIG. 15B are explanatory diagrams for describing an effect of a modified example.
Figure 15B:
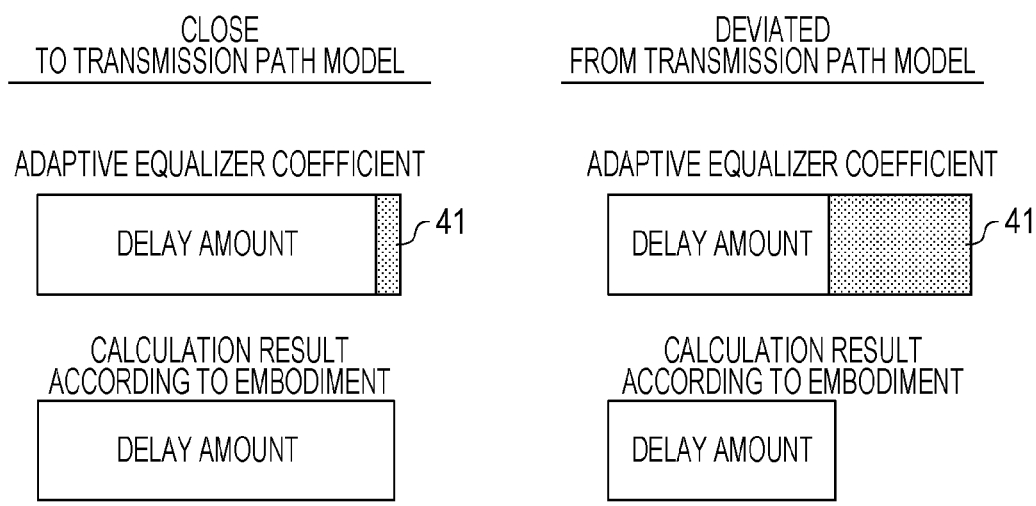

FIG. 15A and FIG. 15B illustrate a modified example. According to the above-mentioned embodiment, the gravity center correction is conducted by the following expression.

$$pGH = \frac{GH + GV}{2} + [\text{SYMBOL\_DIFF}] \cdot \frac{m}{2} \quad (6')$$

$$pGV = \frac{GH + GV}{2} - [\text{SYMBOL\_DIFF}] \cdot \frac{m}{2}$$

In Expression (6'), m denotes an oversampling rate.

According to the method according to the embodiment, the DGD resistance is significantly improved as compared with the related art method, but the errors of the tap coefficient gravity centers (GH and GV) may be increased in several cases, and the correction reference gravity centers (pGH and pGV) may not be accurately calculated in some cases.

In view of the above, according to the modified example, the correction reference gravity centers (pGH and pGV) are calculated by Expression (7).

$$pGH = \text{Adaptive equalizer delay} + \text{SYMBOL\_DIFF} \cdot (m/2)$$

$$pGV = \text{Adaptive equalizer delay} - \text{SYMBOL\_DIFF} \cdot (m/2) \quad (7)$$

The adaptive equalizer delay is a location of the entire signals in the adaptive equalizer 23 (deviation from the tap center). Therefore, the delay amount of the adaptive equalizer 23 can also simply perform the calculation from the tap coefficient gravity centers (GH and GV). However, the tap coefficient gravity center reflects not only the delay amount but also an excessive component.

If a transmission path model and an actual transmission path are approximated to each other, the delay amount can be calculated from the tap coefficient gravity center at a significant accuracy. However, a deviation from the transmission path model may be increased in the actual transmission path. As a result, a large amount of obstructive components are included in the tap coefficient gravity center value, and the error at the time of the calculation for the delay amount is increased.

For example, it is supposed that a band property has a left-right asymmetry with respect to the wavelength of the signal light in the actual transmission path. A high order polarization mode dispersion (PMD) is also generated, and it is supposed that the transmission path model becomes more complex.

As illustrated in FIG. 15A, in a case where the actual transmission path is close to the transmission path model, error components 41 that reflects the tap coefficients of the adaptive equalizer 23 and the gravity center value thereof are little. When the actual transmission path is deviated from the transmission path model, the error components 41 are increased in both the tap coefficients of the adaptive equalizer 23 and the gravity center value thereof, and the delay amount may not be accurately obtained.

In view of the above, M(n) is calculated from the tap coefficients of the adaptive equalizer 23 according to the modified example. M(n) is obtained by calculating a determinant from the coefficient value that has been subjected to discrete Fourier transform. The wavelength dispersion component and the delay amount component remain in M(n) at this time as illustrated in Expression (8).

$$M(n) = \exp\left[j\left(\frac{cD}{2\pi f_c^2}\right)\omega_n^2 + j2\tau_0\omega_n\right] \quad (8)$$

Where c denotes a light speed, D denotes a wavelength dispersion, fc denotes a center frequency of the carrier wave, ω denotes an angular frequency, and τ denotes a delay amount. In view of the above, the delay amount is calculated through a differentiation of M(n).

More specifically, the tap coefficients of the adaptive equalizer having a tap number N are represented by Expression (9).

$$w_{HH}(k), w_{HV}(k), w_{VH}(k), w_{VV}(k)(k=1,\ldots,N) \quad (9)$$

Processing of obtaining the determinant by subjecting this coefficient to the discrete Fourier transform is represented by Expression (10).

$$W(n) = \begin{bmatrix} W_{HH}(n) & W_{VH}(n) \\ W_{HV}(n) & W_{VV}(n) \end{bmatrix} = \quad (10)$$

$$DFT\left(\begin{bmatrix} w_{HH}(k) & w_{VH}(k) \\ w_{HV}(k) & w_{VV}(k) \end{bmatrix}\right)\left(n = -\frac{N}{2}+1, \ldots, \frac{N}{2}\right)$$

$$M(n) = \det W(n) = W_{HH}(n) \cdot W_{VV}(n) - W_{VH}(n) \cdot W_{HV}(n)$$

When M(n) is differentiated once, a primary delay amount $M_1(n)$ is represented by Expression (11).

$$M_1(n) = M(n) \cdot M^*(n+1) \quad (11)$$

When M(n) is differentiated twice, a secondary delay amount $M_2(n)$ is represented by Expression (12).

$$M_2(n) = M_1(n) \cdot M_1^*(n+1) \quad (12)$$

According to a first method, the primary delay amount $M_1(n)$ of M(n) is used as an argument for the adaptive equalizer delay used in Expression (7).

$$\text{Adaptive equalizer delay} = -\frac{N}{4\pi f_s}\langle\arg(M_1(0))\rangle \quad (13)$$

Where fs denotes a sampling frequency of the analog/digital converter (ADC), and N denotes the tap number.

In Expression (13), the delay amount is directly calculated from the tap coefficients. Therefore, it is possible to obtain the correction reference gravity centers pGH and pGV more accurately by using the adaptive equalizer delay in Expression (13) for Expression (7) as compared with the case in which the tap coefficient gravity centers GH and GV are used. The correction reference gravity centers pGH and pGV are equivalent to the fluctuation centers of the tap coefficient gravity centers used according to the embodiment, but the gravity centers serving as the correction reference can be calculated without using the coefficient gravity centers.

According to this method, as illustrated in FIG. 15B, the error component 41 included in the adaptive equalizer coefficient is removed without depending on whether the actual transmission path is approximated to or deviated from the transmission path model, and it is possible to reflect the accurate delay amount.

According to a second method, as represented in Expression (14), the secondary delay amount $M_2(n)$ of M(n) is used as an argument for the wavelength dispersion D(n), and the wavelength dispersion component is removed.

$$\text{Wavelength dispersion } D(n) = \frac{N^2 f_c^2}{4\pi c f_s^2}\langle\arg(M_2(n))\rangle \quad (14)$$

$$\Delta\omega = \frac{2\pi f_s}{N}, \, \omega(n) = n * \frac{2\pi f_s}{N}$$

In this case, the adaptive equalizer delay is represented by Expression $$\text{Adaptive equalizer delay} = -\frac{N}{4\pi f_s}\frac{1}{N-1} \times \quad (15)$$

$$\sum_{n=\frac{N}{2}+1}^{\frac{N}{2}-1}\left\{\langle\arg(M_1(n))\rangle \cdot \exp\left[j\frac{c \cdot D(n)}{2\pi c f_c^2}\Delta\omega(\omega(n)+\omega(n+1))\right]\right\}$$

According to this method, it is possible to still more accurately obtain the correction reference gravity centers as compared with the first method.

As described above, according to the embodiment and the modified example, the correction of shifting the entire tap coefficients in units of symbol is conducted so that the differences between the correction reference gravity centers pGH and pGV (gravity center values serving as the correction references which are calculated on the basis of the delay amounts of the adaptive equalizer) and the tap center are set to be minimum. With this configuration, the gravity centers of the tap coefficients can be shifted to an optimal location, and it is possible to maximize the correction effect. As a result, the DGD resistance is improved, and the increase in bit errors can be suppressed.

It is noted that the present disclosure is not limited only to the embodiment and the modified example. For example, the synchronization symbol difference between the H polarization and the V polarization may also be calculated by the tap coefficient correction unit 33 instead of the symbol synchronization monitor unit 28. In this case, the symbol synchronization monitor unit 28 notifies the tap coefficient correction unit 33 of the symbol synchronization time of the H polarization and the V polarization. In addition, the calculation method for the gravity center of the tap coefficients is not limited to the above-mentioned method according to the embodiment, and the tap location having the highest coefficient may also be set as the tap coefficient gravity center.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method of tap coefficient correction, comprising:
    obtaining a synchronization symbol difference between a first polarization and a second polarization orthogonal to the first polarization;
    calculating a tap coefficient gravity center of the first polarization and a tap coefficient gravity center of the second polarization based on a total sum of power in all tap numbers of a corresponding finite impulse response filter and a square of power of individual tap numbers of individual sequence, the tap coefficient gravity center of the first polarization and the tap coefficient gravity center second polarization represent a delay amount of each of the first polarization and the second polarization in an adaptive equalizer respectively;
    calculating, based on the synchronization symbol difference and the delay amount of each of the first polarization and the second polarization, a correction reference gravity center of the tap coefficients set in the adaptive equalizer where a tap position number is set as a gravity center of tap coefficients, the tap coefficients corresponding to taps included in the adaptive equalizer; and
    performing a correction by shifting the tap coefficients to cause the correction reference gravity center to be closest to a tap center.

2. The method according to claim 1,
    wherein a fluctuation center of the gravity center of the first tap coefficients is calculated as a first correction reference gravity center on the basis of the synchronization symbol difference and the delay amount, and a fluctuation center of the gravity center of the second tap coefficients is calculated as a second correction reference gravity center.

3. The method according to claim 2,
    wherein a correction of shifting the entire first tap coefficients and the entire second tap coefficients in units of symbol is conducted to cause the first correction reference gravity center and the second correction reference gravity center to be closest to the tap center.

4. The method according to claim 1,
    wherein the delay amount is obtained by differentiating a determinant represented by first tap coefficients set in the adaptive equalizer for the first polarization and second tap coefficients set in the adaptive equalizer for the second polarization.

5. The method according to claim 4,
    wherein the delay amount is obtained while a primary delay amount obtained by differentiating the determinant once is set as an argument.

6. The method according to claim 5,
    wherein the delay amount is obtained while a wavelength dispersion is removed by a secondary delay amount obtained by differentiating the determinant twice.

7. The method according to claim 1,
    wherein the synchronization symbol difference is obtained as a difference between a symbol synchronization time of the first polarization and a symbol synchronization time of the second polarization.

8. The method according to claim 1,
    wherein the tap coefficients are read out from the adaptive equalizer before the correction reference gravity center is calculated.

9. An optical receiver, comprising:
    a receiver configured to receive an optical signal and output an electric signal;
    a converter configured to convert the electric signal into a digital signal;
    an adaptive equalizer configured to adaptively equalize the digital signal;
    a monitor configured to monitor a symbol synchronization time of a first polarization included in the digital signal that has been adaptively equalized and a symbol synchronization time of a second polarization orthogonal to the first polarization; and
    a tap coefficient controller connected to the adaptive equalizer and the monitor and configured to control tap coefficients set in the adaptive equalizer,
    wherein the tap coefficient controller configured to:
    obtain a synchronization symbol difference between the first polarization and the second polarization, based on an output of the monitor,
    calculate a tap coefficient gravity center of the first polarization and a tap coefficient gravity center of the second polarization based on a total sum of power in all tap numbers of a corresponding finite impulse response filter and a square of power of individual tap numbers of individual sequence, the tap coefficient gravity center of the first polarization and the tap coefficient gravity center second polarization represent a delay amount of the first polarization and the second polarization in the adaptive equalizer respectively,
    calculate, based on the synchronization symbol difference and the delay amount, a correction reference gravity center of the tap coefficients set in the adaptive equalizer where a tap position number is set as a gravity center of tap coefficients, the tap coefficients corresponding to taps included in the adaptive equalizer, and
    perform a correction by shifting the tap coefficients to cause the correction reference gravity center to be closest to a tap center.

10. The optical receiver according to claim 9,
    wherein the adaptive equalizer has first tap coefficients for the first polarization and second tap coefficients for the second polarization, and
    wherein the tap coefficient controller calculates a fluctuation center of the gravity center of the first tap coefficients as a first correction reference gravity center on the basis of the gravity center of the first tap coefficients and the gravity center of the second tap coefficients, and the synchronization symbol difference, and calculates a fluctuation center of the gravity center of the second tap coefficients as a second correction reference gravity center.

11. The optical receiver according to claim 10,
    wherein the tap coefficient controller performs a correction of shifting the entire first tap coefficients and the entire second tap coefficients in units of symbols to cause the first correction reference gravity center and the second correction reference gravity center to be closest to the tap center.

12. The optical receiver according to claim 9,
wherein the adaptive equalizer includes first tap coefficients for the first polarization and second tap coefficients for the second polarization, and
wherein the tap coefficient controller obtains the delay amount by differentiating a determinant represented by the first tap coefficients and the second tap coefficients.

13. The optical receiver according to claim 12,
wherein the tap coefficient controller obtains the delay amount while a primary delay amount obtained by differentiating the determinant once is set as an argument.

14. The optical receiver according to claim 13,
wherein the tap coefficient controller obtains the delay amount while a wavelength dispersion is removed by a secondary delay amount obtained by differentiating the determinant twice.

15. The optical receiver according to claim 9,
wherein the tap coefficient controller obtains the synchronization symbol difference on the basis of a difference between a symbol synchronization time of the first polarization and a symbol synchronization time of the second polarization.

16. The optical receiver according to claim 9,
wherein the tap coefficient controller reads out the tap coefficients from the adaptive equalizer before the fluctuation center is calculated.

* * * * *